United States Patent [19]
Holyoak

[11] Patent Number: 5,340,120
[45] Date of Patent: Aug. 23, 1994

[54] FISH RODEO GAME AND METHOD HAVING A LASSO APPARATUS AND METHOD

[76] Inventor: Hugh K. Holyoak, Highway 29 North, Alapaha, Ga. 31622

[21] Appl. No.: 970,575

[22] Filed: Nov. 3, 1992

[51] Int. Cl.⁵ .................. A63B 71/02; A01K 74/00; A01K 29/00
[52] U.S. Cl. ............................ 273/447; 43/4.5; 43/87; 119/215; 119/805
[58] Field of Search .............. 273/447, 440, 457, 140; 119/153.3; 43/4, 5, 4.5, 87

[56] References Cited

U.S. PATENT DOCUMENTS

| | | | |
|---|---|---|---|
| 474,103 | 5/1892 | Shaw | 119/153 |
| 761,796 | 6/1904 | Tuttle | 119/153 |
| 1,818,301 | 8/1931 | Canaday | 119/153 |
| 1,933,855 | 11/1933 | Johnson | 43/87 |
| 2,179,394 | 11/1939 | Wulff | 43/87 |
| 2,408,141 | 9/1946 | Heil | 273/140 X |
| 2,635,877 | 4/1953 | Levenstein | 119/3 X |
| 2,704,052 | 3/1955 | Wood | 43/87 X |
| 2,756,054 | 7/1956 | Strohm | 273/140 |
| 3,717,123 | 2/1973 | Regnier | 119/3 |
| 3,765,119 | 10/1973 | Hare et al. | 43/87 |
| 3,886,902 | 6/1975 | Haynes | 119/3 |
| 4,216,607 | 8/1980 | Lyster | 43/87 |
| 4,272,075 | 6/1981 | Rogers, Jr. | 273/140 X |
| 4,432,544 | 2/1984 | Wakimura | 273/140 X |
| 5,207,424 | 5/1993 | Bleam et al. | 273/140 |

*Primary Examiner*—Paul E. Shapiro
*Attorney, Agent, or Firm*—Hopkins & Thomas

[57] ABSTRACT

A fish rodeo game (10) enables a game participant to catch fish (52) floating within a water body (12) utilizing a lasso apparatus (50). The water body (12) is confined within an enclosure (14). A plurality of containers or baskets (48) are disposed around the periphery of the enclosure (14). Fish (52) are captured utilizing the lasso apparatus (50) and are released within the baskets (48) during a prescribed time period. The lasso apparatus (50) has a fishing line (54) with a closable noose (58). The noose (58) has a noose cord (63) which is of sufficient resiliency so that the noose (58) is maintained in an open position when substantially no pulling tension is exerted on the noose cord (63). Further, a weight (74) may be disposed to urge the noose (58) to a closed position when pulling tension is exerted on the fishing line (54) and thus the noose cord (63).

14 Claims, 2 Drawing Sheets

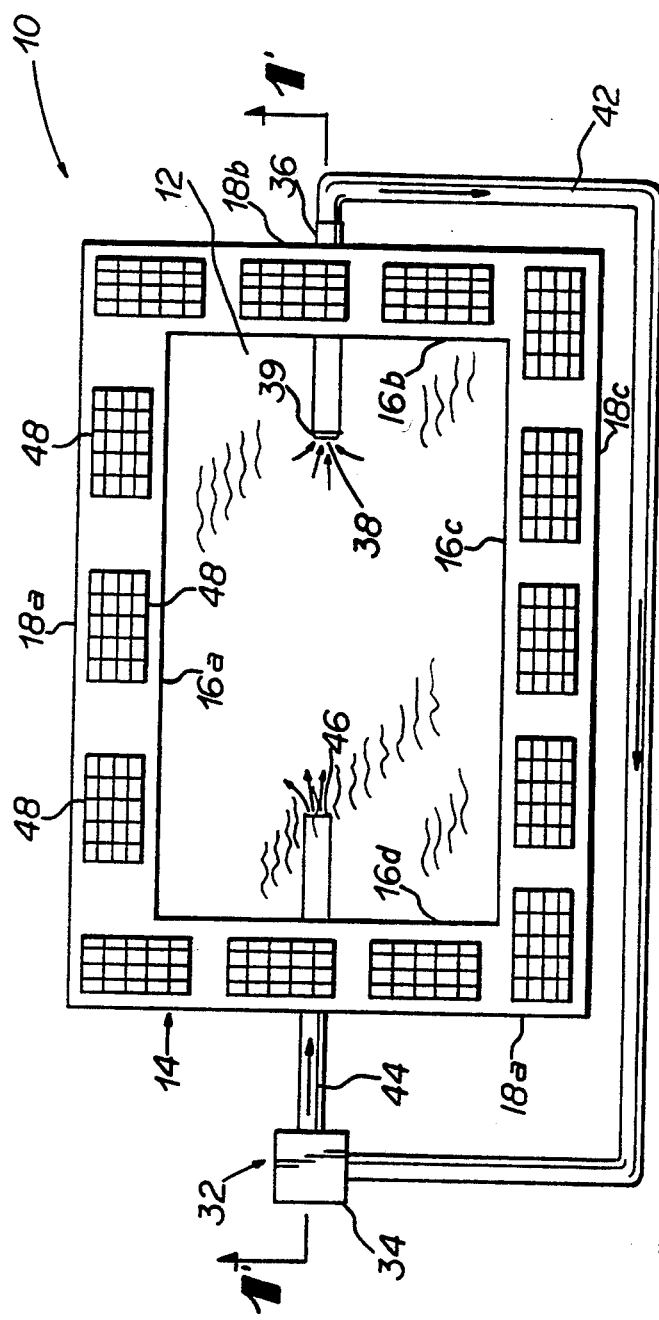
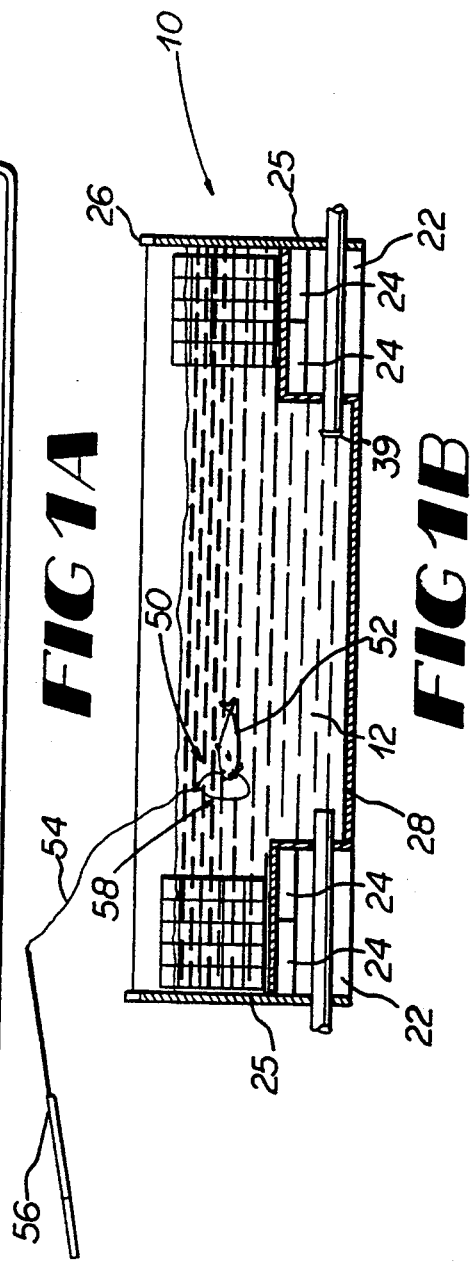
FIG 1A
FIG 1B

FISH RODEO GAME AND METHOD HAVING A LASSO APPARATUS AND METHOD

FIELD OF THE INVENTION

The present invention generally relates to recreation and amusement, and more particularly, to a fish rodeo game and method having a lasso apparatus and method for catching fish while in water.

BACKGROUND OF THE INVENTION

Many conventional techniques and apparatuses are known in the art of fishing for catching or capturing fish while in a body of water. For instance, a hook on a fishing line having perhaps bait can be used to snag fish in the water. The hook can be sunk to the bottom with a weight and, if desired, the line can be suspended from a float connected to the fishing line. Another technique for catching fish involves using a net having a mesh smaller than the fish to be captured. Usually, the net is moved through the water and thereby collects the fish in its path.

SUMMARY OF THE INVENTION

Broadly stated, the present invention is a fish rodeo game apparatus and method employing a lasso. The apparatus for the fish rodeo game has a tank of water containing one or more fish and a lasso assembly for catching the fish within the water body. The water can be confined in any enclosure having an open top. Further, one or more smaller containers may be placed around the water as receptacles for the fish being caught by individuals operating the lasso apparatus. Generally, the fish rodeo game is played for recreation and amusement by catching as many fish as possible and placing them in the one or more containers during a prescribed time period.

The lasso apparatus has a flexible resilient noose cord forming a closed noose. A fishing line is connected to the noose and is moved by the game participant, or user, in order to pass the noose around the fish and then pulled closed in order to capture fish within the noose. A fishing pole may be connected to the fishing line for manipulating the line and the noose. One end of the noose preferably has a swivel for eliminating entanglement and undesirable twisting. In this regard, the noose cord has a small cord eyelet which is connected to a first swivel eyelet of the swivel. The swivel has a second swivel eyelet surrounding the other end portion of the noose cord and permitting the noose cord to slide therethrough. Moreover, the noose cord is of sufficient resiliency to maintain the noose in an open position for entry and capture of fish therein. Preferably, a weight is disposed on the noose cord to facilitate the sinking of the noose and to facilitate the moving of the noose to a closed position when a pull is exerted on the line.

Therefore, an object of the present invention is to provide a lasso apparatus and method for catching fish within water.

Another object of the present invention is to provide a game and method for recreation and amusement wherein fish are captured within water.

Another object of the present invention is to provide a game which can easily be assembled and disassembled.

Another object of the present invention is to provide an apparatus and method for selectively and individually capturing fish within water.

Another object of the present invention is to provide a lasso apparatus and method for catching fish in water without harming the fish.

Another object of the present invention is to provide a lasso apparatus and method for catching fish of various sizes.

Another object of the present invention is to provide a lasso apparatus which is simple in design, inexpensive to manufacture, and efficient as well as reliable in operation under water.

Other objects, features, and advantages of the present invention will become apparent to one of skill in the art upon examination of the following drawings and the associated detailed description.

BRIEF DESCRIPTION OF THE DRAWINGS

The present invention can be better understood with reference to the following drawings. The drawings are not necessarily to scale, emphasis instead being placed upon clearly illustrating principles of the present invention.

FIG. 1A is a top view of a novel fish rodeo game in accordance with the present invention;

FIG. 1B is a side view of the fish rodeo game of FIG. 1 taken along line 1'—1'.

DETAILED DESCRIPTION OF THE PREFERRED EMBODIMENT

Figure 2:
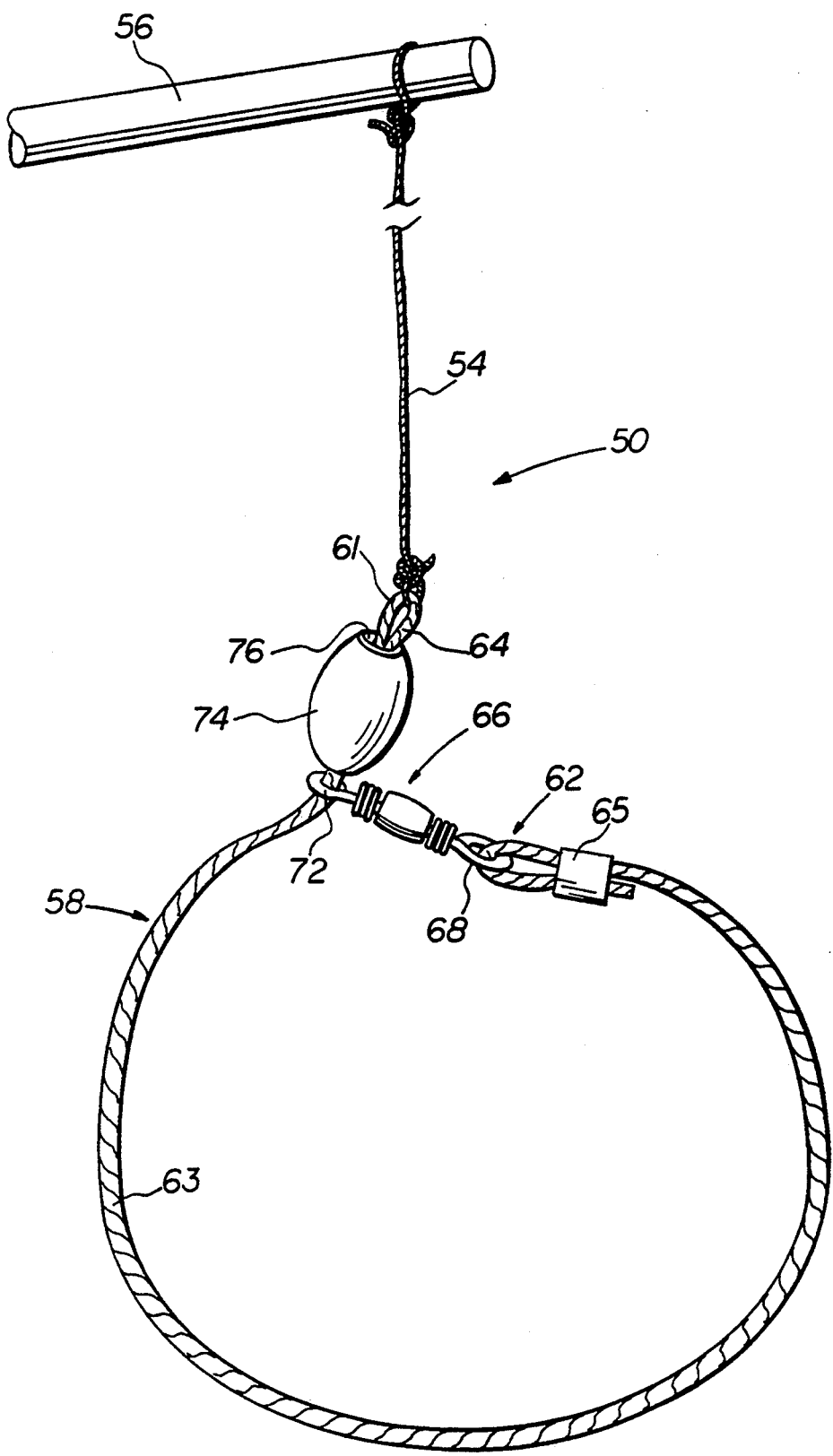
FIG. 2 is a perspective view of a novel lasso apparatus used in the fish rodeo game of FIGS. 1A and 1B.

With reference now to the drawings wherein like reference numerals designate corresponding parts throughout the several views, FIGS. 1A and 1B illustrate a novel fish rodeo game 10 for recreation and amusement, and a novel lasso apparatus 50 for catching fish within a body 12 of water provided by the fish rodeo game 10 in accordance with the present invention. The water body 12 is confined by an enclosure 14, for instance, a tank or other suitable containing means for confining the water body 12. Preferably, as shown in FIG. 1B, the enclosure 14 is fabricated in a stepped configuration having a lower rectangular region defined by side walls 16a–16d and an upper rectangular region defined by side walls 18a–18d. The side walls 16a–16d are made by disposing a plurality of cement blocks 22 side-by-side around the periphery of the fish rodeo game 10. Upon the tops of the blocks 22 are placed two adjacent wooden boards 24. The side walls 18a–18d of the upper rectangular region are fabricated by disposing a plurality of plywood sheets 25 about the outermost periphery of the rodeo game apparatus 10 and anchored at their respective lower portions to the blocks 22 and/or boards 24. A plastic border 26 is disposed around the top periphery of the side walls 18a–18d. The plastic border 26 serves as a safety mechanism and may also be utilized for hanging devices, such as the novel lasso apparatus 50. Finally, as shown in FIG. 1B, a thin water-proof liner 28, which is preferably a plastic or rubber material, is situated along the entire interior of the enclosure 14 for providing leak-proof confinement of the water body 12 within the enclosure 14.

A filtering mechanism 32 filters impurities from the water body 12. The filtering mechanism 32 comprises a combined pump and filter system 34 for circulating and filtering water within a closed loop system. The closed loop system is defined by the following: a rigid water inlet pipe 36 having an inlet orifice 38 with strainer 39 disposed within the water body 12, a flexible water hose 42 connected to the inlet pipe 36 and leading to the pump and filter system 34, and a rigid water outlet pipe 44 connected to the pump and filter system 34 and having a water outlet orifice 46 disposed within the water body 12 in opposing relationship to the water inlet orifice 38.

A plurality of containers or baskets 48, which are akin to rodeo corrals, are situated around the periphery of the upper rectangular region of the enclosure 14, residing over and supported by the boards 24. The baskets 48 are box-like having an open top, meshed side walls, and a meshed bottom wall. Thus, water may freely pass in and out of the baskets 48 and the baskets 48 may be freely entered by a game participant via the top.

The lasso apparatus 50 for catching fish 52 within the water body 12 has a flexible fishing line 54 hanging from a rigid elongated pole 56. At the end of the fishing line 54 is a closable noose 58 configured to catch the fish 52. The pole 56 can be made of any suitable material, such as plastic, fiberglass, aluminum, or the like.

As illustrated in FIG. 2, the noose 58 of the lasso apparatus 50 has a first rigid circular cord eyelet 61 and a second rigid circular cord eyelet 62 at opposing ends of a resilient noose cord 63. The eyelets 61, 62 are formed by looping and clamping the noose cord via respective metal clamps 64, 65. The first cord eyelet 61 is connected to the fishing line 54. The second cord eyelet 62 is linked to a swivel 66 via a first rigid circular swivel eyelet 68. A second rigid circular swivel eyelet 72 of the swivel 66 surrounds the noose cord 63 and permits the noose cord 63 to slide therethrough to thereby form a closable noose 58. The swivel 66 enables the noose 58 and/or noose cord 63 to be moved and reoriented in the water body 12 without undesirable twisting, entanglement, or other adverse effects. It should be noted that the noose cord 63, having negative buoyancy (specific gravity >1), is fabricated from a suitable material of sufficient resiliency so that the noose 58 is maintained in an open position for receiving fish 52 when no pulling tension is exerted on the fishing line 54. In the preferred embodiment, a nylon material is used to fabricate the noose cord 63.

An ellipsoidal weight 74, preferably lead, may be disposed to urge the noose 58 to a closed position when pulling tension is applied to the fishing line 54. In the preferred embodiment, the weight 74 has an elongated central aperture 76 for receiving the noose cord 63 and for permitting the noose cord 63 to slide substantially frictionlessly therethrough so that the weight 74 engages the second swivel eyelet 72 by force of gravity. The weight 74 exerts closing force on the noose 58, but the magnitude of the weight 74 is insufficient to overcome the resiliency of the noose cord 63 without the aid of pulling tension on the fishing line 54 and cord 63. Once pulling tension is applied to the fishing line 54 and cord 63, the weight 74 helps to quickly urge the noose 58 to a closed and binding position about the fish 52.

Use and operation of the fish rodeo game 10 and lasso apparatus 50 occurs as follows. A game participant stands just outside of the periphery of the enclosure 14 and is provided with the lasso apparatus 50. Further, the game participant is allotted a prescribed time period in which to catch as many fish 52 as possible within the allotted time period. In order to capture the fish 52, the game participant inserts the noose 58 of the lasso apparatus 50 within the water body 12 and holds the noose 58 so that the fish 52 passes partially through the noose 58. The noose 58 may be suspended in the water body 12 above the lower surface of the enclosure 14 or may be rested against any interior surface of the enclosure 14 or rested in any other creative orientation. After the fish 52 has progressed far enough within the noose 58, the fishing line 54 is pulled upwardly by the game participant via the rigid pole 56. As upward pulling tension is exerted on the fishing line 54 and hence noose cord 63, the noose 58 begins to enclose about the fish 52 by force of the pulling tension and by the force imposed via weight 74, notwithstanding the resilient nature of the noose cord 63. Thus, as a result of the foregoing procedure, the fish 52 is tightly engaged around its periphery by the noose 58 and may be transported or directed to any desired location. In accordance with the fish rodeo game, the fish 52 is placed into another separate confinement area so that a count can be kept of a total number of fish 52 caught within the preselected time period. Thus, the fish 52 is placed within any of the baskets 48 within the enclosure 14. In a sense, the baskets 48 are rodeo corrals.

It will be obvious to those skilled in the art that many variations and modifications may be made to the above-described preferred embodiment of the fish rodeo game 10 and/or the fish lasso apparatus 50 without substantially departing from the spirit and scope of the present invention. As examples, the enclosure 14 may be provided as a circular enclosure or other suitable enclosure. As another example, the baskets 48 could be replaced with buckets having a continuous or perforated side wall. Accordingly, all such variations and modifications are intended to be included herein within the scope of the present invention and within the scope of the following claims.

Wherefore the inventor claims the following:

1. A fish rodeo method for recreation and amusement, comprising the steps of:
   providing a body of water having a fish;
   inserting a lasso in said water, said lasso comprising a noose cord with a pulling end and a sliding end, said sliding end having a cord eyelet, said lasso further comprising a swivel having a first swivel eyelet connected to said noose cord eyelet and a second swivel eyelet surrounding said cord and permitting said core to slide therethrough to thereby form a noose for catching fish, and said noose cord being of sufficient resiliency to maintain said noose in an open position when no pulling tension is exerted on said noose cord at said pulling end, said lasso further comprising a weight having a volume with a central aperture for permitting said noose cord to slide therethrough, said weight for engaging said second swivel eyelet and for urging said noose to a closed position upon exerting said pulling tension at said pulling end; and
   catching said fish with said lasso.

2. The method of claim 1, further comprising the step of placing said fish in a container after catching said fish with said lasso.

3. The method of claim 1, further comprising the steps of confining said water in an enclosure with an open top and inserting said lasso into said open top.

4. The method of claim 1, further comprising the steps of filtering said water with a filtering system.

5. The method of claim 1, further comprising the step of maneuvering said noose cord with a rigid elongated handle attached to said cord.

6. A fish rodeo game for recreation and amusement, comprising:
   a lasso apparatus having a cord forming a noose for catching fish, said cord being of sufficient resiliency so that said noose is maintained in an open position, said cord having a cord eyelet at an end of said cord, said lasso apparatus having a swivel having a first swivel eyelet connected to said cord eyelet and a second swivel eyelet surrounding said cord and permitting said cord to slide therethrough to thereby form said noose, said lasso apparatus comprising a weight having a volume with a central aperture for permitting said cord to slide therethrough, said weight for engaging said second swivel eyelet to thereby urge said noose to a closed position when catching said fish; and
   a volume of water for confining fish and configured to receive said lasso apparatus.

7. The fish rodeo game of claim 6, further comprising a container for placing said fish with said lasso apparatus after being captured by said lasso apparatus.

8. The fish rodeo game of claim 6, further comprising an enclosure for said water with an open top configured to receive said lasso apparatus.

9. The fish rodeo game of claim 6, further comprising a means for filtering said water.

10. The fish rodeo game of claim 6, further comprising a fishing line attached to said cord and a rigid elongated handle attached to said fishing line.

11. A lasso apparatus for catching fish in water, comprising:
    a cord having a cord eyelet at an end;
    a swivel having a first swivel eyelet connected to said cord eyelet and a second swivel eyelet surrounding said cord and permitting said cord to slide therethrough to thereby form a noose for catching fish;
    a weight slidable along said cord and configured to engage said second swivel eyelet; and
    said cord being of sufficient resiliency to maintain said noose in an open position.

12. The lasso apparatus of claim 11, further comprising a fishing line attached to said cord and a rigid elongated handle attached to said fishing line.

13. The lasso apparatus of claim 11, wherein said weight comprises a volume with a central aperture for permitting said cord to slide therethrough.

14. The lasso apparatus of claim 13, wherein said weight is ellipsoidal in shape.

* * * * *